United States Patent
Chung

(10) Patent No.: US 7,024,338 B2
(45) Date of Patent: Apr. 4, 2006

(54) SYSTEM AND METHOD FOR IMPROVING TFT-ARRAY MANUFACTURING YIELDS

(75) Inventor: Kyo Young Chung, San Jose, CA (US)

(73) Assignee: Yieldboost Tech, Inc., San Jose, CA (US)

(*) Notice: Subject to any disclaimer, the term of this patent is extended or adjusted under 35 U.S.C. 154(b) by 0 days.

(21) Appl. No.: 10/642,617

(22) Filed: Aug. 19, 2003

(65) Prior Publication Data

US 2004/0150408 A1    Aug. 5, 2004

Related U.S. Application Data

(63) Continuation-in-part of application No. 10/388,481, filed on Mar. 17, 2003, which is a continuation-in-part of application No. 10/355,059, filed on Jan. 31, 2003, now Pat. No. 6,862,489.

(51) Int. Cl.
  *G01N 27/00* (2006.01)
  *G01N 35/00* (2006.01)
  *G06F 19/00* (2006.01)

(52) U.S. Cl. ............... 702/185; 324/770; 702/84; 700/97

(58) Field of Classification Search ............ 702/81–84, 702/183, 185; 700/97; 324/500, 512, 770, 324/537; 349/43
See application file for complete search history.

(56) References Cited

U.S. PATENT DOCUMENTS 5,546,013 A * 8/1996 Ichioka et al. ............... 324/770
6,466,882 B1 * 10/2002 Kang et al. ................... 702/84

* cited by examiner

*Primary Examiner*—Michael Nghiem
*Assistant Examiner*—John Le
(74) *Attorney, Agent, or Firm*—Fleshner & Kim L.L.P.

(57) ABSTRACT

A system and method for detecting defects in TFT-array panels is provided that improves defect detection accuracy by adjusting the thresholding parameters used to classify defective pixels when the number of defects reported by a TFT-array testing system exceeds a predetermined critical number. In a preferred embodiment, the thresholding parameters are adjusted until the number of reported defects is less than or equal to the predetermined critical number. The predetermined critical number represents a threshold number for determining if the number of reported defects is abnormally high. Reducing the number of reported defects to a number equal to or less than the predetermined critical number will decrease the operation time of the TFT-array repair equipment, because of the reduced number of potential defects it will be required to handle, and will also result in the TFT-array testing system reporting a smaller number of potential defects, with the potential defects that are reported having a higher probability of being real defects.

8 Claims, 10 Drawing Sheets

SYSTEM AND METHOD FOR IMPROVING TFT-ARRAY MANUFACTURING YIELDS

CROSS-REFERENCE TO RELATED APPLICATIONS

This application is a continuation-in-part of U.S. patent application Ser. No. 10/388,481, filed Mar. 17, 2003, which is a continuation-in-part of U.S. patent application Ser. No. 10/355,059, filed Jan. 31, 2003 now U.S. Pat. No. 6,862,489. The contents of both of the above-identifed U.S. Patent Applications are incorporated herein by reference in their entirety.

BACKGROUND OF THE INVENTION

1. Field of the Invention

This invention relates to LCD manufacturing and, more particularly, to a system and method for improving TFT-array manufacturing yields.

2. Background of the Related Art

Yield management is important in LCD manufacturing. In LCD manufacturing, a single large plate of glass is divided into just a handful of LCD panels. As consumer demand grows for larger and larger displays, substrates get larger and the number of LCD panels per glass plate decreases. Accordingly, production yields are critical in LCD manufacturing.

The majority of the costs of an LCD panel comes from manufacturing. As a result, profitability is closely linked to yield rates. Any changes in yield rates will have a financial impact.

LCD panel production is a highly automated process involving various manufacturing stages. Each manufacturing stage consists of many complex steps. For example, one stage of the process creates the thin-film transistor arrays on the glass substrate, which includes multiple passes of thin film deposition, resist layers, exposure, development, etching and stripping. The opportunities for defects occur at nearly every step of every stage in the manufacturing process.

Defects take several different forms, and can generally be divided into optical, mechanical and electrical defects. Some of these defects can be repaired, while others are permanent and may be severe enough to render the LCD panel unusable.

Optical defects are the most common defect. When this type of defect is present, a pixel is "stuck" in either a bright state, in which the pixel always transmits light, or a dark state, in which the pixel never transmits light. The most common cause for this type of defect is an electrical problem, such as a short or an open circuit in the cell's transistor or signal leads. Light or dark spots can also be caused by foreign particle contamination between the glass plates, or between the LCD panel and the backlight.

Another type of optical defect is non-uniformity, which can be caused by non-uniform cell gaps that result in varying thickness of the liquid crystal layer. Uniformity problems can also be caused by errors in the rubbing process for liquid crystal alignment layers, inconsistent color filter thickness or incomplete removal of chemical residues.

Mechanical defects can include broken glass and broken electrical connections. Broken electrical connections can arise from improper assembly, errors in alignment of the components and/or mishandling.

Some LCD manufacturers use testing and inspection equipment that can automatically evaluate panels at intermediate points in the manufacturing process. In some cases, the defects can be automatically repaired. However, comprehensive testing in the LCD production process slows down production. In addition, there are capital and maintenance costs associated with the test equipment. Accordingly, manufacturers have to balance the need for comprehensive and accurate testing against the need to avoid slowing production as much as possible.

SUMMARY OF THE INVENTION

An object of the invention is to solve at least the above problems and/or disadvantages and to provide at least the advantages described hereinafter.

To achieve the objects, and in accordance with the purpose of the invention, as embodied and broadly described herein, the present invention provides a system and method for detecting defects in TFT-array panels. The system and method of the present invention improves defect detection accuracy by adjusting the thresholding parameters used to classify defective pixels when the number of defects reported by a TFT-array testing system exceeds a predetermined critical number. In a preferred embodiment, the thresholding parameters are adjusted until the number of reported defects is less than or equal to the predetermined critical number. The predetermined critical number represents a threshold number for determining if the number of reported defects is abnormally high.

In most cases, defects caused by process non-uniformities and process contamination are hard to identify under a microscope, and they cannot be repaired by TFT-array repair equipment even if they are identified. Thus, reducing the number of reported defects to a number equal to or less than the predetermined critical number will decrease the operation time of the TFT-array repair equipment, because of the reduced number of potential defects it will be required to handle.

Inaccuracies in the TFT-array testing system can also cause an abnormally high number of reported defects. In this case, reducing the number of reported defects to a number equal to or less than the predetermined critical number will result in the TFT-array testing system reporting a smaller number of potential defects, with the potential defects that are reported having a higher probability of being real defects. Thus, the present invention improves the defect detection accuracy of the TFT-array testing system, even when the system's intrinsic performance is inaccurate.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

I. Thin-Film Transistor (TFT) Liquid Crystal Display (LCD) Fabrication

Figure 1A:
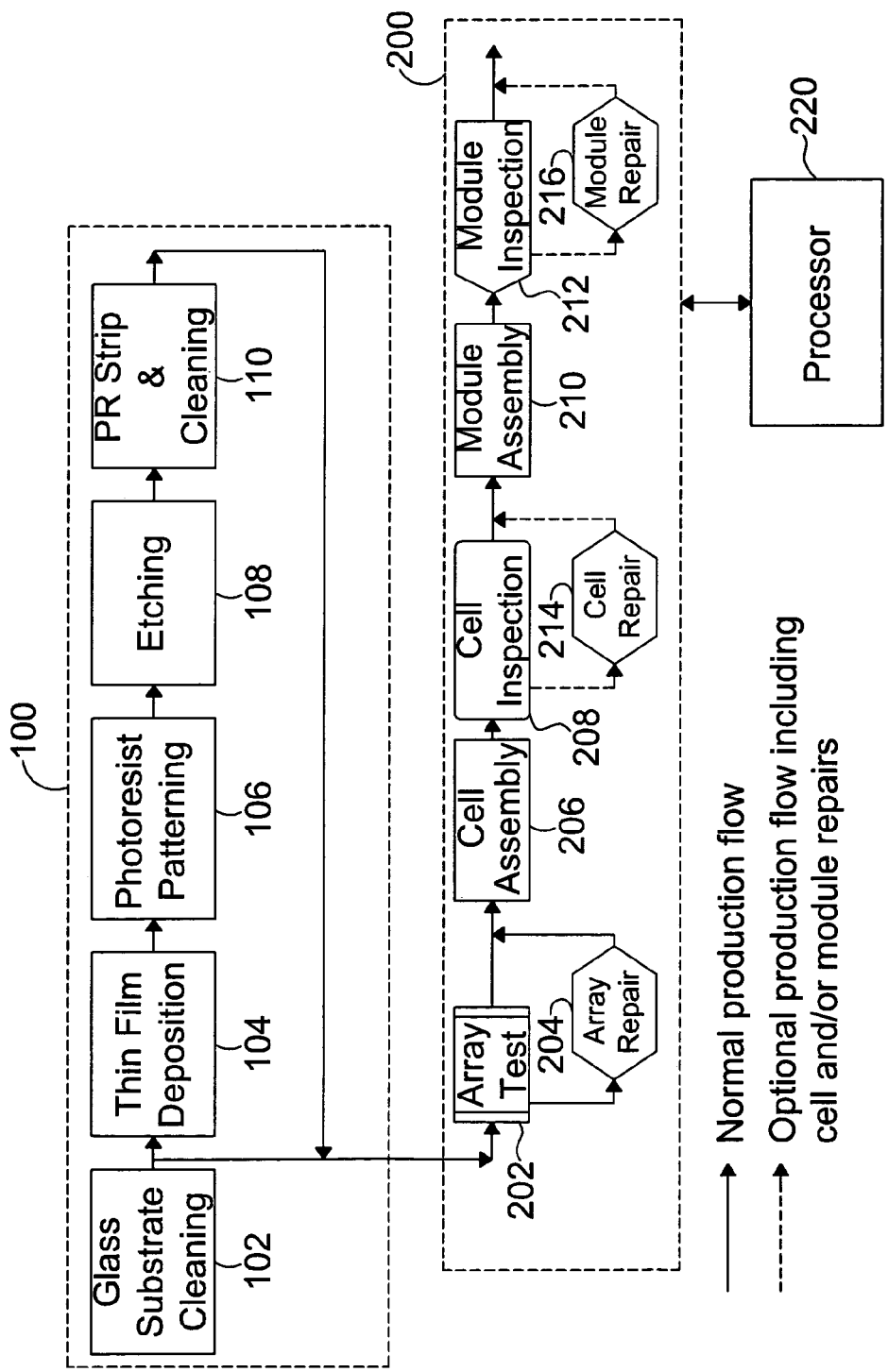
FIG. 1A is a block diagram of the process flow for TFT-LCD fabrication, in accordance with the present invention.

FIG. 1A is a block diagram of the process flow for TFT-LCD fabrication. The fabrication process can be divided into two stages, an array panel fabrication stage 100, in which the thin-film transistor (TFT) array panels are fabricated on a substrate, and a test and assembly stage 200, in which the TFT-array panels are tested and the displays are assembled.

In the array panel fabrication stage, the glass substrate on which the TFT-array panels are fabricated is cleaned at step 102. Steps 104–110 represent well known process steps for forming TFT-array panels on a glass substrate. They consist of a thin film deposition step 104, a photoresist patterning step 106, and etching step 108 and a photoresist stripping and cleaning step 110. Steps 104–110 are repeated for each patterned thin film layer that is deposited on the glass substrate.

Multiple TFT-array panels are typically fabricated on each glass substrate, which are also referred to as TFT-array base plates. A display unit, such as an LCD display, utilizes one TFT-array panel.

Once the TFT-array panels are fabricated on the glass substrate, the TFT-array panels proceed to the test and assembly stage 200, during which the TFT-array panels are tested, the liquid crystal (LC) cells are assembled and separated, and the electrical connections are made to the liquid crystal cells to yield the liquid crystal modules that will ultimately be used in the LCDs. The assembly stage consists of various substages, including an array test stage 202, an array repair stage 204, a cell assembly stage 206, a cell inspection stage 208, a module assembly stage 210 and a module inspection stage 212. The assembly stage 200 may also optionally include a cell repair stage 214 and a module repair stage 216.

In the array test stage 202, each TFT-array panel is tested by driving the panel with a test signal, which will be explained in more detail below. TFT-array panels that are determined to be bad (e.g., defective) are sent to the array repair stage 204. The panels that are determined to be good are sent to the cell assembly stage 206. In the array repair stage 204, the bad panels that can be repaired are repaired using techniques known in the art, and the repaired panels are then sent to the cell assembly stage 206.

In the cell assembly stage 206, the LC cells are assembled by laminating front and rear glass plates to the TFT-array panels and injecting liquid crystal material between the front and rear glass plates using techniques known in the art. In addition, the individual LC cells are separated from each other at this stage by dicing the TFT-array base plate (glass substrate).

The assembled and separated LC cells are then sent to the cell inspection stage 208, where they are inspected for defects. LC cells that are determined to be damaged can be sent to an optional cell repair stage 214. The LC cells that are determined to be good LC cells, and the repaired LC cells, if the optional cell repair stage 214 is implemented, are then sent to the module assembly stage 210.

In the module assembly stage 210, the required electrical connections are made to the LC cells to yield the LCD modules that will ultimately be used in LCDs. The LCD modules then proceed to the module inspection stage 212, where they are tested using techniques known in the art. An optional module repair stage 216 can be used to repair LCD modules that are deemed to be defective at the module inspection stage 212.

Figure 1B:
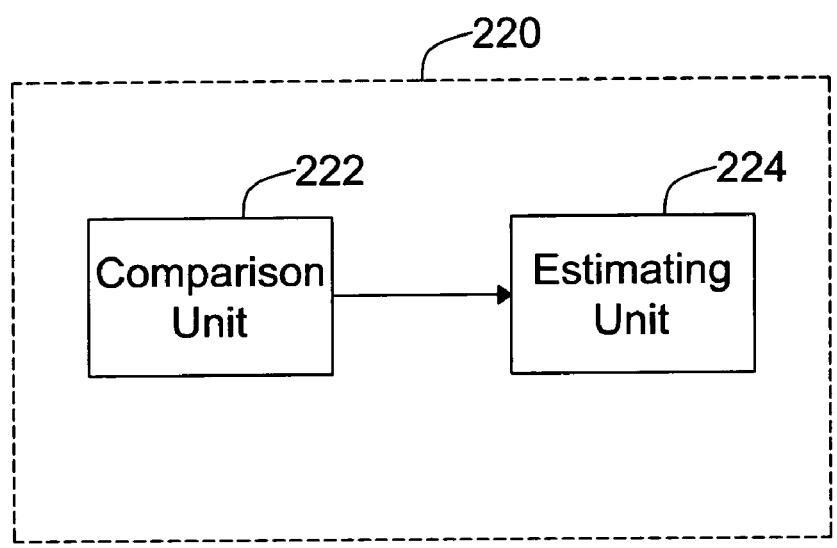
FIG. 1B is a block diagram of one preferred embodiment of the processor of FIG. 1A.

A processor 220 sends and receives data to/from the test and assembly stage 200. In a preferred embodiment, shown in FIG. 1B, the processor 220 includes a comparison unit 222 and an estimating unit 224. The comparison unit 222 compares the inputs and outputs of the various substages in the test and assembly stage 200 for different manufacturing setups. The estimating unit 224 receives comparison data from the comparison unit 222, and estimates the effect that a change in the manufacturing setup has on a desired parameter, such as profit. The estimating unit 224 utilizes methodologies that will be described below. The estimate data produced by the estimating unit 224 may be used to optimize the manufacturing setup used by the test and assembly stage 200.

II. Profit Model for TFT-LCD Fabrication

A profit model for TFT-LCD fabrication, in accordance with one embodiment of the present invention, will be described with reference to FIG. 2, which is a block diagram of the assembly stage 200 of the process flow shown in FIG. 1.

Figure 2:
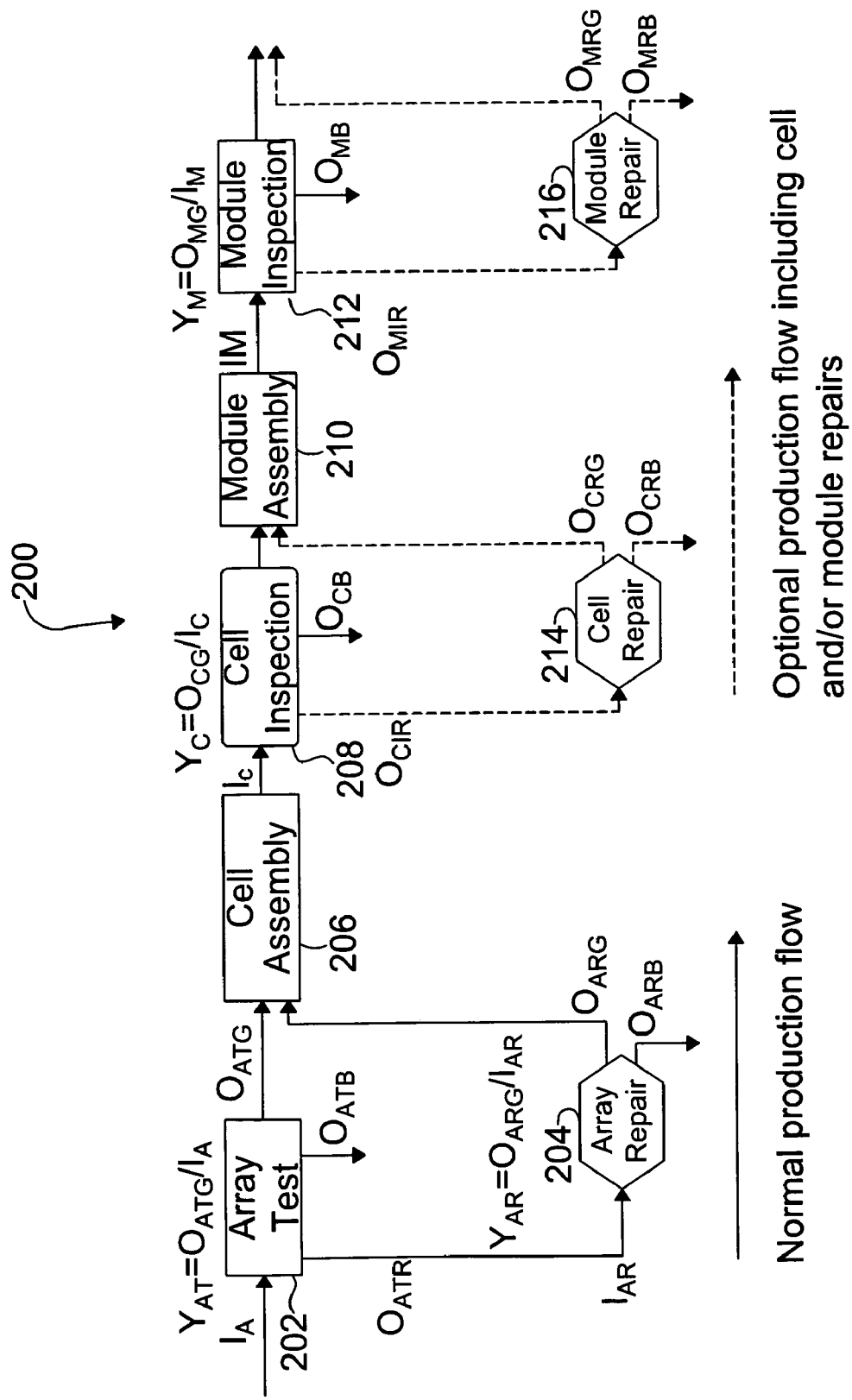
FIG. 2 is a block diagram of the assembly stage 200 of the process flow shown in FIG. 1.

The variables used to describe the main process stages of FIG. 2 are defined as follows:

$I_A$=Number of input panels to array test stage 202;
$I_{AR}$=Number of input panels to array repair stage 204;
$I_C$=Number of input panels to cell inspection stage 208;
$I_M$=Number of input panels to module inspection stage 212;
$O_{ATG}$=Number of passed panels at array test stage 202;
$O_{ATB}$=Number of irreparably bad panels at array test stage 202;
$O_{ATR}$=Number of reparable panels at array test stage 202, which is the same as $I_{AR}$;
$O_{ARG}$=Number of passed panels at array repair stage 204;
$O_{ARB}$=Number of bad panels at array repair stage 204;
$O_{CG}$=Number of passed panels at cell inspection stage 208;
$O_{CB}$=Number of irreparably bad panels at cell inspection stage 208;
$O_{MG}$=Number of passed panels at module inspection stage 212; and $O_{MB}$=Number of irreparably bad panels at module inspection stage 212.

For the optional production flow stages 214 and 216, the additional variables used are defined as follows:

$O_{CIR}$=Number of reparable panels at cell inspection stage 208;

$O_{MIR}$=Number of reparable panels at module inspection stage 212;

$O_{CRG}$=Number of passed panels at cell repair stage 214;

$O_{MRG}$=Number of passed panels at module repair stage 216;

$O_{CRB}$=Number of bad panels at cell repair stage 214; and $O_{MRB}$=Number of bad panels at module repair stage 216.

A model that describes the relationship between profits and variations in yields at cell and module inspections will now be described. Certain cost variables will be used as follows:

$C_A$=Cost to make a TFT panel;
$C_T$=Cost to test a TFT panel;
$C_R$=Cost to repair a TFT panel;
$C_C$=Cost of cell assembly for a TFT panel;
$C_{CI}$=Cost of cell inspection for a TFT panel;
$C_M$=Cost of module assembly for a TFT panel; and
$C_{MI}$=Cost of module inspection for a TFT panel.

In order to have an initial reference for the evaluation of changes in the manufacturing parameters used in the testing, inspection, or assembly stages, a current manufacturing setup is called a "primary manufacturing setup", and the results obtained with the primary manufacturing setup are referred to as "primary results."

The cost analysis is done in connection with the assembly stage 200 of the process flow, without the optional cell repair stage 214 and module repair stage 216. This assumes that there is no difference in costs and output quantities between the primary manufacturing setup and a proposed new manufacturing setup. The cost to manufacture a TFT-LCD panel using the primary setup, $COST_{PRIME}$, can be expressed as follows:

$COST_{PRIME}$=Array manufacturing cost+Array test cost+Array repair cost+Cell assembly cost+Cell inspection cost+Module assembly cost+Module inspection cost. (1)

One can obtain the expressions for the cost values as follows:

Array manufacturing cost=$I_A C_A$ (2)

Array test cost=$I_A C_T$ (3)

Array repair cost=$I_{AR} C_R$ (4)

Cell assembly cost=$I_C C_C$ (5)

Cell inspection cost=$I_C C_{CI}$ (6)

Module assembly cost=$I_M C_M$ (7)

Module inspection cost=$I_M C_{MI}$ (8)

The yields at each stage are defined as follows:

Yield of array test $(Y_{AT})=O_{ATG}/I_A$ (9)

Yield of array repair $(Y_{AR})=O_{ARG}/I_{AR}$ (10)

Yield of cell inspection $(Y_C)=O_{CG}/I_C$ (11)

Yield of module inspection $(Y_M)=O_{MG}/I_M$ (12)

Since $I_M=O_{CG}$ without the optional cell repair and module repair stages 214 and 216, Equation (11) can be written as:

$$I_M = Y_C I_C \quad (13)$$

From Equations (1), (2)–(8), and (13) one obtains:

$$COST_{PRIME}=I_A C_A+I_A C_T+I_{AR} C_R+I_C C_C+I_C C_{CI}+ Y_C I_C C_M + Y_C I_C C_{MI} \quad (14)$$

The value of the final TFT-LCD module output, in the case of the primary manufacturing setup without the optional cell repair and module repair stages 214 and 216, can be expressed as follows:

$$PRODUCT_{PRIME}=O_{MG} P_{VALUE}, \quad (15)$$

where $P_{VALUE}$ is the value of a TFT-LCD module fabricated using the primary manufacturing setup. From Equations (12), (13), and (14), one obtains:

$$PRODUCT_{PRIME}=Y_M Y_C I_C P_{VALUE} \quad (16)$$

When a new manufacturing setup is used in the array test stage 202, cell inspection stage 206, module inspection stage 212, cell assembly stage 206, and/or module assembly stage 210, one can expect to have new values represented by the following variables:

$I'_{AR}$=New number of input panels to array repair;
$I'_C$=New number of input panels to cell inspection;
$I'_M$=New number of input panels to module inspection;
$O'_{ATG}$=New number of passed panels at array test;
$O'_{ATB}$=New number of irreparably bad panels at array test;
$O'_{ATR}$=New number of reparable panels at array test, which is the same as $I'_{AR}$;
$O'_{ARG}$=New number of passed panels at array repair;
$O'_{ARB}$=New number of bad panels at array repair;
$O'_{CG}$=New number of passed panels at cell inspection, which is same as $I'_M$;
$O'_{CB}$=Number of bad panels at cell inspection;
$O'_{MG}$=New number of passed panels at module inspection;
$O'_{MB}$=New number of bad panels at module inspection;
$Y'_{AT}$=New yield of array test;
$Y'_{AR}$=New yield of array repair;
$Y'_C$=New yield of cell inspection; and
$Y'_M$=New yield of module inspection.

One can then obtain a new set of expressions for the new manufacturing setup, without the optional cell repair and module repair stages 214 and 216, as follows:

$$COST_{NEW}=I_A C_A+I_A C_T+I'_{AR} C_R+I'_C C_C+I'_C C_{CI}+ Y'_C I'_C C_M + Y'_C I'_C C_{MI} \quad (17)$$

$$PRODUCT_{NEW}=Y'_M Y'_C I'_C P'_{VALUE}, \quad (18)$$

where $P'_{VALUE}$ is the value of the TFT-LCD module fabricated with the new manufacturing setup.

The profit increase (or deficit decrease), P, that results from the new manufacturing setup is obtained as follows:

$$P=COST_{PRIME}-COST_{NEW}+PRODUCT_{NEW}-PRODUCT_{PRIME} \quad (19)$$

From Equations (14), (16), (17), (18), and (19) one obtains the following expression for P:

$$P=(I_{AR}-I'_{AR})C_R+(I_C-I'_C)C_C+(I_C-I'_C)C_{CI}+Y_C I_C C_M+ Y_C I_C C_{MI}-Y'_C I'_C C_M-Y'_C I'_C C_{MI}+ Y'_M Y'_C I'_C P'_{VALUE}-Y_M Y_C I_C P_{VALUE} \quad (20)$$

During regular production of a TFT-LCD, one can assume that $O_{ATB}+O_{ARB} \cong O'_{ATB}+O'_{ARB}$, because a bad panel usually gets carried to the next process stage, as the individual panels have not yet been separated from each other and are all on a common TFT-array base plate. If this assumption is valid, then with $$I_C = I_A - (O_{ATB} + O_{ARB}), \text{ and} \quad (21)$$

$$I'_C = I_A - (O'_{ATB} + O'_{ARB}), \quad (22)$$

one obtains:

$$I_C \cong I'_C \quad (23)$$

Using Equation (23) in Equation (20), one obtains $$P \cong (I_{AR} - I'_{AR})C_R + (Y_C - Y'_C)I_C(C_M + C_{MI}) + (Y'_M Y'_C P'_{VALUE} - Y_M Y_C P_{VALUE})I_C \quad (24)$$

Since the value of a TFT-LCD module is irrelevant to the manufacturing setup, one obtains:

$$P_{VALUE} = P'_{VALUE} \quad (25)$$

Thus, with Equation (25), Equation (24) can be further simplified as:

$$P \cong (I_{AR} - I'_{AR})C_R + (Y_C - Y'_C)I_C(C_M + C_{MI}) + (Y'_M Y'_C - Y_M Y_C)P_{VALUE}I_C \quad (26)$$

Accordingly, Equation (26) can be used to calculate the profit increase or decrease as a result of the yield variation that occurs due to a new manufacturing setup.

One can use the relationships described above to evaluate the profits and the production quantities needed to achieve a break-even point in TFT-LCD manufacturing. This type of cost analysis is done based on the assumption that no TFT-array panels are discarded as bad panels during TFT-array process. The cost of TFT-LCD panel (COST) can be expressed as follows:

COST=Array manufacturing cost+Array test cost+ Array repair cost+Cell assembly cost+Cell inspection cost+Module assembly cost+Module inspection cost+Packaging cost+Storage and transportation cost+Other fixed cost. (27)

One can obtain additional expressions for the cost values as follows:

Packaging cost=$I_M C_P$; and (28)

Storage and transportation cost=$I_M C_S$, (29)

where $C_P$ and $C_S$ are the unit packaging and storage/transportation cost, respectively.

From Equations (2)–(8), (13), (27), (28), and (29) one obtains:

$$COST = I_A C_A + I_A C_T + I_{AR} C_R + I_C C_C + I_C C_{CI} + Y_C I_C (C_M + C_{MI} + C_P + C_S) + C_F, \quad (30)$$

where $C_F$ is other fixed costs. The value of the final output, without the optional cell and module repair stages 214 and 216, can be expressed as follows:

$$PRODUCT = O_{MG} D_{SALE}, \quad (31)$$

where $D_{SALE}$ is the sales price of a TFT-LCD product unit.

From Equations (12), (13), and (31), one obtains:

$$PRODUCT = Y_M Y_C I_C D_{SALE}. \quad (32)$$

Then, the profit (PT) is obtained by:

$$PT = PRODUCT - COST. \quad (33)$$

From Equations (30), (32), and (33), one obtains:

$$PT = Y_M Y_C I_C D_{SALE} - (I_A C_A + I_A C_T + I_{AR} C_R + I_C C_C + I_C C_{CI} + Y_C I_C (C_M + C_{MI} + C_P + C_S) + C_F). \quad (34)$$

Using Equation (21) in Equation (34), one obtains:

$$PT = Y_M Y_C (I_A - O_{ATB} - O_{ARB}) D_{SALE} - (I_A C_A + I_A C_T + I_{AR} C_R + C_F + (I_A - O_{ATB} - O_{ARB})(C_C + C_{CI} + Y_C C_M + Y_C C_{MI} + Y_C C_P + Y_C C_S)). \quad (35)$$

If one defines $Y_T$ as:

$$Y_T \cong (O_{ATB} + O_{ARB})/I_A, \quad (36)$$

then Equation (35) becomes:

$$PT = Y_M Y_C I_A (1 - Y_T) D_{SALE} - (I_A (C_A + C_T) + I_{AR} C_R + C_F + I_A (1 - Y_T)(C_C + C_{CI} + Y_C (C_M + C_{MI} + C_P + C_S))). \quad (37)$$

$I_A$ for the break-even point where PT is zero ($I_{A-EVEN}$) becomes:

$$I_{A-EVEN} = (I_{AR} C_R + C_F)/(Y_M Y_C (1 - Y_T) D_{SALE} - (C_A + C_T + (1 - Y_T)(C_C + C_{CI} + Y_C (C_M + C_{MI} + C_P + C_S)))). \quad (38)$$

In normal production, one can assume:

$$O_{ATB} \ll I_A \quad (39)$$

Thus, with Equation (9), one obtains:

$$I_{AR} = O_{ATR} = I_A - O_{ATB} - O_{ATG} \cong I_A - O_{ATG} = I_A (1 - Y_{AT}). \quad (40)$$

From Equations (37) and (40), one obtains:

$$PT \cong Y_M Y_C I_A (1 - Y_T) D_{SALE} - (C_F + I_A (C_A + C_T + (1 - Y_{AT}) C_R + (1 - Y_T)(C_C + C_{CI} + Y_C (C_M + C_{MI} + C_P + C_S)))). \quad (41)$$

$I_{A-EVEN}$ is again obtained for $I_A$, making PT=0 in Equation (41), as follows:

$$I_{A-EVEN} \cong C_F / (Y_M Y_C (1 - Y_T) D_{SALE} - (C_A + C_T + (1 - Y_{AT}) C_R + (1 - Y_T)(C_C + C_{CI} + Y_C (C_M + C_{MI} + C_P + C_S)))). \quad (42)$$

Accordingly, the profit and the production quantities needed for break-even can be derived from yield numbers, cost numbers and sales price.

The profit model described above is applicable to a production line model that does not utilize the cell and module repair stages 214 and 216. However, it should be appreciated that the profit model described above can be adapted for a production line model that does utilize the optional cell and model repair stages 214 and 216, while still falling within the scope of the present invention. Further, if the optional cell and module repair stages 214 and 216 are used, but the cell and module repair rates are so low as to not make a significant contribution to the yield rates, then the above-described profit model may be applied.

III. Identifying Defects During TFT-Array Panel Testing

Each TFT-array panel is tested in the array test stage 202 using array testing equipment known in the art. When each TFT-array panel is tested by the array testing equipment, the TFT-array panel is driven by electrical signals and the storage capacitor of each pixel goes through electrical charging and discharging operations in order to achieve certain target voltage signals. The sensor of the array test equipment measures the pixel voltage on the storage capacitor of every pixel of the TFT-array panel. If a pixel has a defect, then the pixel voltage of the defected pixel is different from the pixel voltage of the normal pixels. The difference between the defected pixel voltage and the normal pixel voltage is called a "defect signal."

Figure 3A:
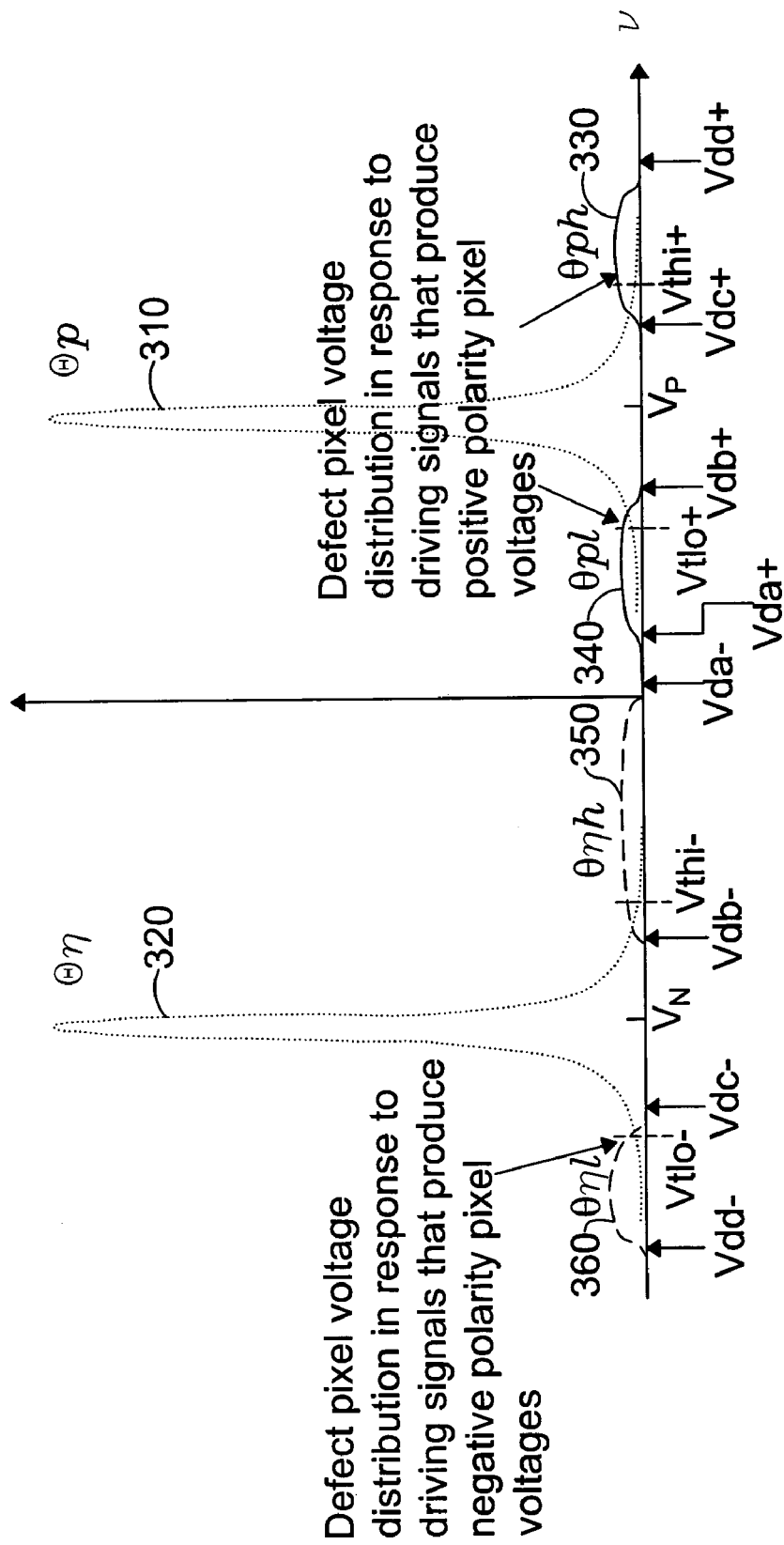
FIG. 3A is a plot showing the pixel voltage distribution when half of the pixels of the TFT-array panel have positive pixel voltages and the other half have negative pixel voltages, in accordance with the present invention.

FIG. 3A is a plot showing the pixel voltage distribution when half of the pixels of the TFT-array panel have positive pixel voltages and the other half have negative pixel voltages. These distributions can be represented by a statistical distribution function because of the large number of pixels in each TFT-array panel, and because of the sensor's statistical behavior. The distribution function for normal positive pixel voltages 310 is well represented by a normal distribution function as follows:

$$\Theta p = N_P \exp[-(v-V_P)^2/(2\sigma_P^2)]/\sqrt{2\pi\sigma_P^2}, \quad (43)$$

where Θp represents the distribution function for normal positive pixel voltages, $N_P$ is the total number of pixels having normal positive pixel voltages, v is a pixel voltage variable, $V_P$ is a mean value and $\sigma_P$ is a standard deviation of the normal distribution function for positive pixel voltages.

$N_P$ can be obtained by subtracting the number of defective pixels having positive pixel voltages from the total number of pixels having positive pixel voltages, and can be approximated to be the total number of pixels having positive pixel voltages because the number of defective pixels having positive pixel voltages is far lower than the number of normal pixels having positive pixel voltages.

The distribution function for normal negative pixel voltages 320 is similarly well represented by a normal distribution function as follows:

$$\Theta n = N_N \exp[-(v-V_N)^2/(2\sigma_N^2)]/\sqrt{2\pi\sigma_N^2}, \quad (44)$$

where Θn represents the distribution function for normal negative pixel voltages, $N_N$ is a total number of pixels having normal negative pixel voltage, and $V_N$ is a mean value and $\sigma_N$ is a standard deviation of normal distribution function for negative pixel voltages.

$N_N$ can be obtained by subtracting the number of defective pixels having negative pixel voltages from the total number of pixels having negative pixel voltages, and can be approximated to be the total number of pixels having negative pixel voltages because the number of defective pixels having negative pixel voltages is far lower than the number of normal pixels having negative pixel voltages. The values of $V_P$, $\sigma_P$, $V_N$, and $\sigma_N$ can be typically obtained from the array testing equipment.

The plot of FIG. 3 also shows the defective pixel voltage distributions 330 (θph), 340 (θpl), 350 (θnh), and 360 (θnl). θph and θpl represent the defective pixel voltage distributions in response to driving signals that produce positive polarity pixel voltages. θnh and θnl represent defective pixel voltage distributions in response to driving signals that produce negative polarity pixel voltages.

The array testing equipment uses thresholding parameters of Vthi+, Vtlo+, Vthi−, and Vtlo− to detect the defective pixels. Pixels driven to have positive pixel voltages are reported as defective when their pixel voltages fall outside of the positive threshold region between Vthi+ and Vtlo+. Pixels driven to have negative pixel voltages are reported as defective when their pixel voltages fall outside of the negative threshold region between Vthi− and Vtlo−.

Under-Killed and Over-Killed Defects

If a normal pixel exhibits a pixel voltage that is outside of the threshold region, then the normal pixel is wrongly classified as a defective pixel. This erroneous classification is called an "over-killed defect." If a defective pixel exhibits a pixel voltage that is inside of the threshold region, then the defective pixel is wrongly characterized as a normal pixel. This erroneous classification is called an "under-killed defect."

Under-killed defects lower the yields at the cell inspection stage 208 ($Y_C$) and/or the yields at the module inspection stage 212 ($Y_M$). Over-killed defects lower the productivity of the array repair equipment used in the array repair stage 204. Therefore it is very important to set the right values for the thresholding parameters, in order to maximize profit or minimize the loss of product fabrication.

Improving Defect Detection Accuracy of TFT-Array Tester

1. Adaptive Thresholding

As the size of TFT-LCDs increase for use in larger TFT-LCD displays, the TFT-array tester has to take multiple measurements to test a single TFT-array panel. This is because, once the TFT-array panel exceeds a certain size, the measurement sensor of TFT-array testers can not cover the entire TFT-array panel. Thus, multiple measurements are performed by the TFT-array tester for one TFT-array panel.

Figure 3B:
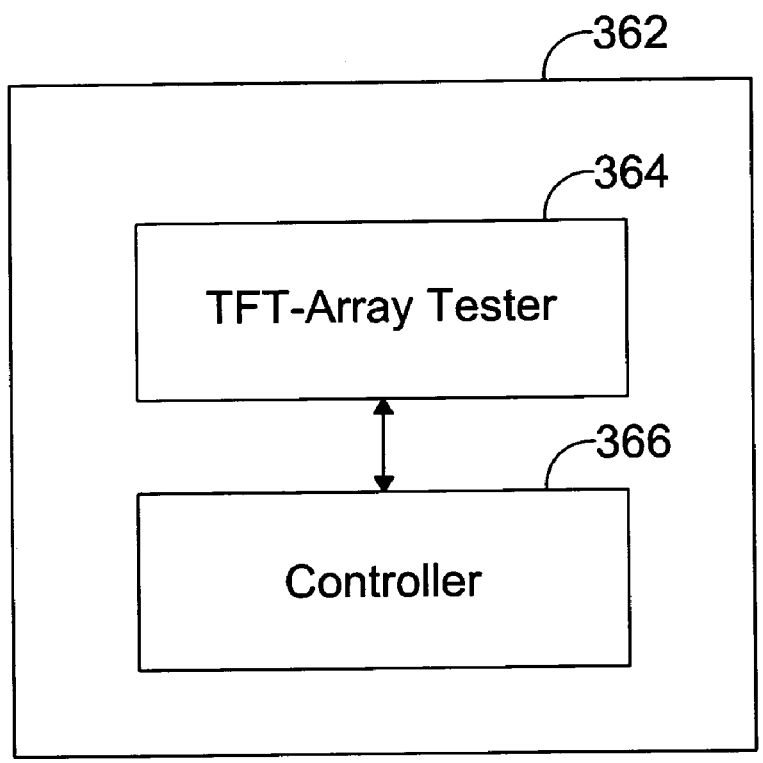
FIG. 3B is a block diagram of a TFT-array testing system, in accordance with the present invention.

FIG. 3B is a block diagram of a TFT-array testing system 362, which includes a TFT-array tester 364 and a controller 366. For large TFT-array panels, the TFT-array tester 364, under the control of the controller 366, takes measurements at one portion of the TFT-array panel, and then either the TFT-array panel or the sensor (not shown) of TFT-array tester 364 is moved, preferably via a stepping motion, so that another portion of the TFT-array panel can be tested.

Because either the sensor of the TFT-array tester 362 or the TFT-array panel is moved between measurements, the pixel voltage distributions (310, 320, 330, 340, 350 and 360 in FIG. 3A) may change after each measurement due to environmental changes or other causes. If fixed thresholding parameters are used, such as the fixed thresholding parameters Vthi+, Vtlo+, Vthi− and Vthl− in FIG. 3A, the defect detection accuracy decreases, because the fixed thresholding parameters are designed to be used with substantially fixed pixel voltage distributions.

One way of mitigating this effect and improving the defect detection accuracy of the TFT-array testing system 362 is to use "relative thresholding", in which the mean values of the pixel voltage distributions ($V_P$ and/or $V_N$ in FIG. 3A) are obtained at each measurement position, and predetermined constants are added to or subtracted from the mean pixel voltage distributions to obtain the values for the thresholding parameters.

Figure 3C:
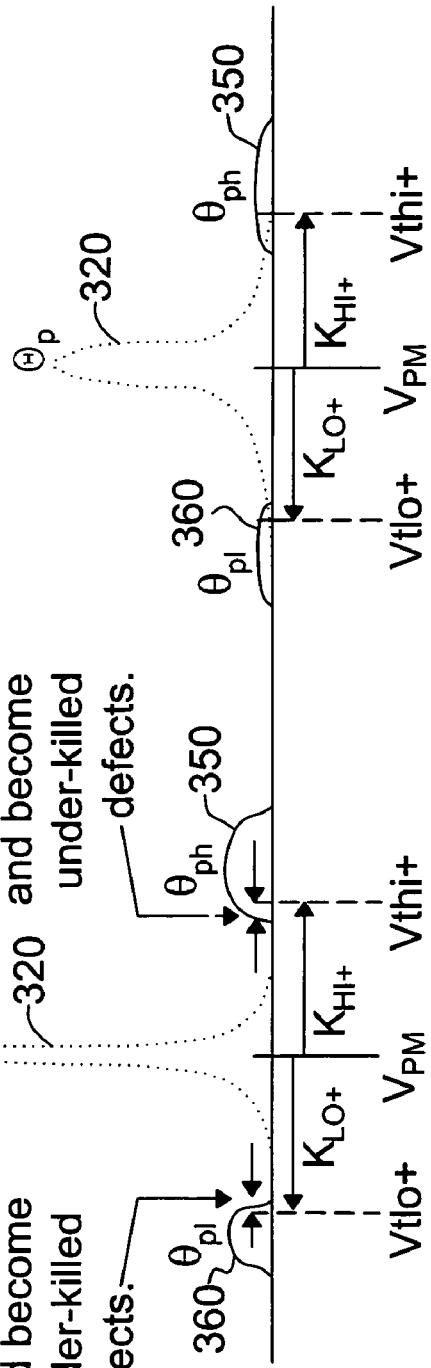
FIG. 3C are plots showing measured pixel voltage distributions for pixels driven with positive voltages, along with thresholding parameters calculated using a "relative thresholding" method.

This relative thresholding method is illustrated in FIG. 3C, which are plots showing measured pixel voltage distributions for pixels driven with positive voltages, along with thresholding parameters calculated using the relative thresholding method. Although only pixel voltage distributions for pixels driven with positive voltages are shown for ease of illustration, it should be appreciated that the following method can also be applied to pixels driven with negative voltages.

Like the distributions shown in FIG. 3A, the distributions shown in FIG. 3C are represented by a statistical distribution function because of the large number of pixels in each TFT-array panel, and because of the sensor's statistical behavior. Plot (1) shows a measured pixel voltage distribution having a relatively small standard deviation $\sigma_P$ and plot (2) shows a measured pixel voltage distribution having a relatively large standard deviation $\sigma_P$.

Using the relative thresholding method, the thresholding parameters are calculated as follows:

$$Vthi+ = (V_{PM} + K_{HI+});$$

$$Vtlo+ = (V_{PM} - K_{LO+});$$

$$Vthi- = (V_{NM} + K_{HI-}); \text{ and}$$

$$Vtlo- = (V_{NM} - K_{LO-});$$

where $V_{PM}$ and $V_{NM}$ are the measured mean pixel voltage values for positively and negatively driven pixels, respectively, and $K_{HI+}$, $K_{LO+}$, $K_{HI-}$, and $K_{LO-}$ are the predetermined constants that are added to or subtracted from the measured mean pixel voltage values.

Figure 3D:
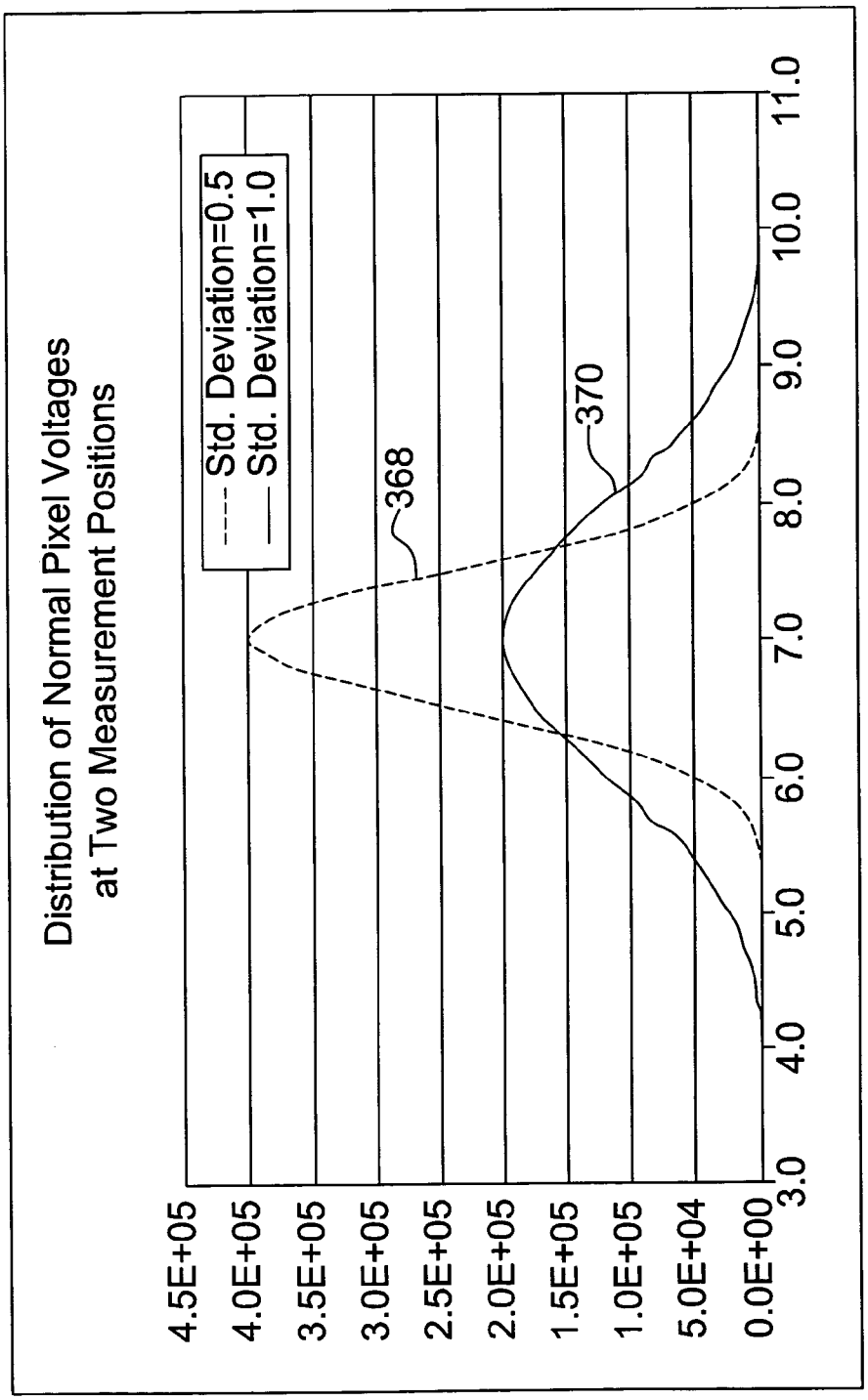
FIG. 3D is a plot showing an example of pixel voltage distributions at two measurement points on a TFT-array panel.

The relative thresholding method reduces the effect of moving mean pixel voltage values on the defect detection accuracy. However, this method does not take into account changes in the standard deviation $\sigma_P$ of the pixel voltage distribution due to environmental changes or other causes. The change in the standard deviation of the pixel voltage distribution is illustrated in FIG. 3D, which is a plot showing an example of pixel voltage distributions at two measurement points.

Pixel voltage distribution 368 is for a first measurement point on a TFT-array panel, and pixel voltage distribution 370 is for a second measurement point on the TFT-array panel. Both pixel voltage distributions 368 and 370 exhibit the same mean value of approximately 7.0, but the standard deviation of pixel voltage distribution 368 is 0.5, while the standard deviation of pixel voltage distribution 370 is 1.0. The change in the standard deviation may be caused by environmental factors, variations in the manufacturing process, or by other factors.

Similarly, plot (1) of FIG. 3C is for a first measurement point on a TFT-array panel having a first standard deviation, and plot (2) in FIG. 3C is for a second measurement point on the TFT-array panel having a second, larger standard deviation. A larger standard deviation means a wider pixel voltage distribution 320. A wider pixel voltage distribution means that some pixels exhibiting voltages in the normal range may exceed the thresholding limits set by the predetermined constants in the relative thresholding method, and be falsely classified as defective.

In order to avoid this phenomena when using the relative thresholding method, larger values must be used for the predetermined constants. However, using larger values for the predetermined constants will result in a decrease in detection accuracy if the standard deviation goes down in subsequent measurements, such as the measurement shown in plot (1).

Figure 3E:
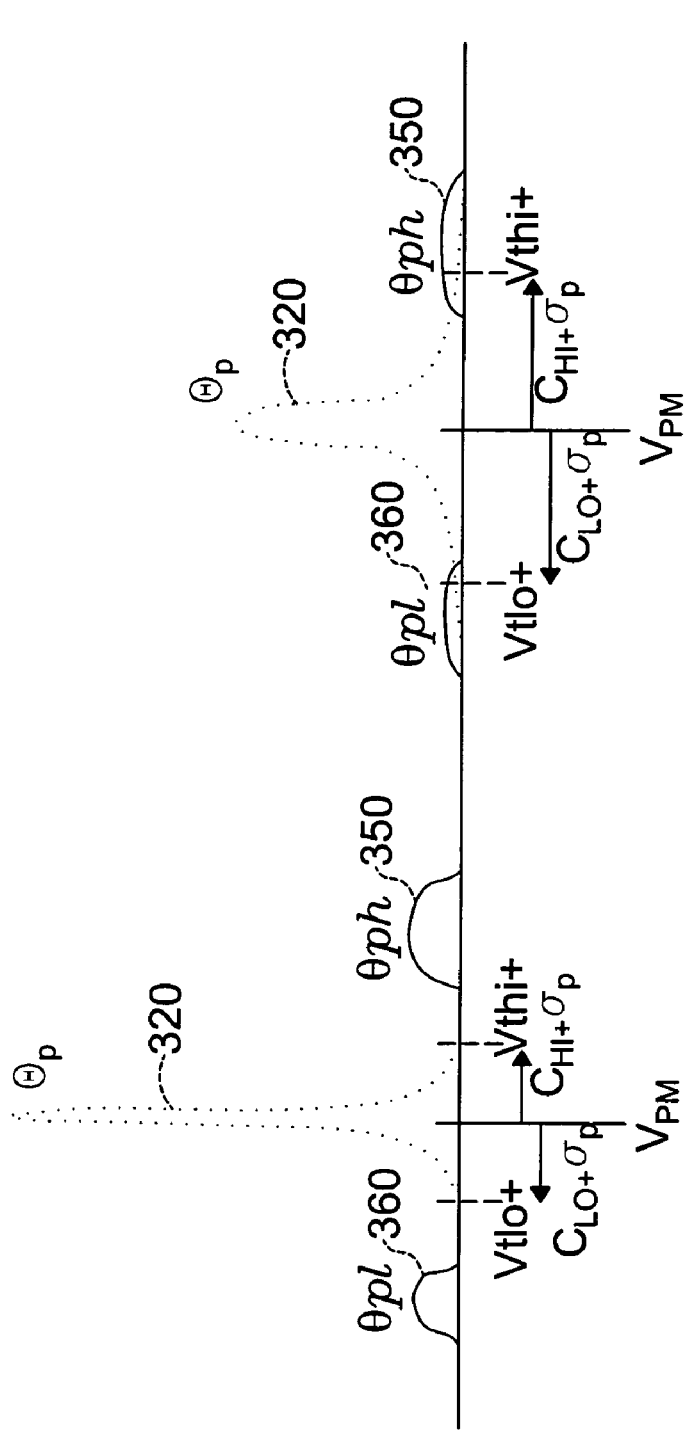
FIG. 3E are plots showing measured pixel voltage distributions for pixels driven with positive voltages, along with thresholding parameters calculated using a "standard deviation" method, in accordance with the present invention.

Accordingly, a preferred method of determining the thresholding parameters is illustrated in FIG. 3E, which are plots showing measured pixel voltage distributions for pixels driven with positive voltages, along with thresholding parameters calculated using a "standard deviation" method.

With the standard deviation method, the standard deviation of the pixel voltage distribution is obtained at each measurement point. The thresholding parameters for each measurement point are then obtained by multiplying the standard deviation value obtained for the current measurement point by a predetermined constant to yield on offset value, and adding the offset value to the measured mean pixel voltage value. Using the relative thresholding method, the thresholding parameters are calculated as follows:

$$Vthi+=[V_{PM}+(C_{HI+}\sigma_P)];$$

$$Vtlo+=[V_{PM}-C_{LO+}\sigma_P)];$$

$$Vthi-=[V_{NM}+C_{HI-}\sigma_N)]; \text{ and}$$

$$Vtlo-=[V_{NM}-C_{LO-}\sigma_N)];$$

where $V_{PM}$ and $V_{NM}$ are the measured mean pixel voltage values for positively and negatively driven pixels, respectively, and $C_{HI+}$, $C_{LO+}$, $C_{HI-}$, and $C_{LO-}$ are the predetermined constants that are multiplied by the standard deviation $\sigma_P$ and $\sigma_N$, respectively.

By using the measured standard deviation at each measurement position, the thresholding parameters are adjusted based on actual standard deviations at each measurement position. Thus, because the changes in standard deviation are taken into account when setting the thresholding parameters, one does not have to reduce the detection accuracy at measurement positions with small standard deviations in order to avoid false defects at measurement positions exhibiting large standard deviations.

Figure 3F:
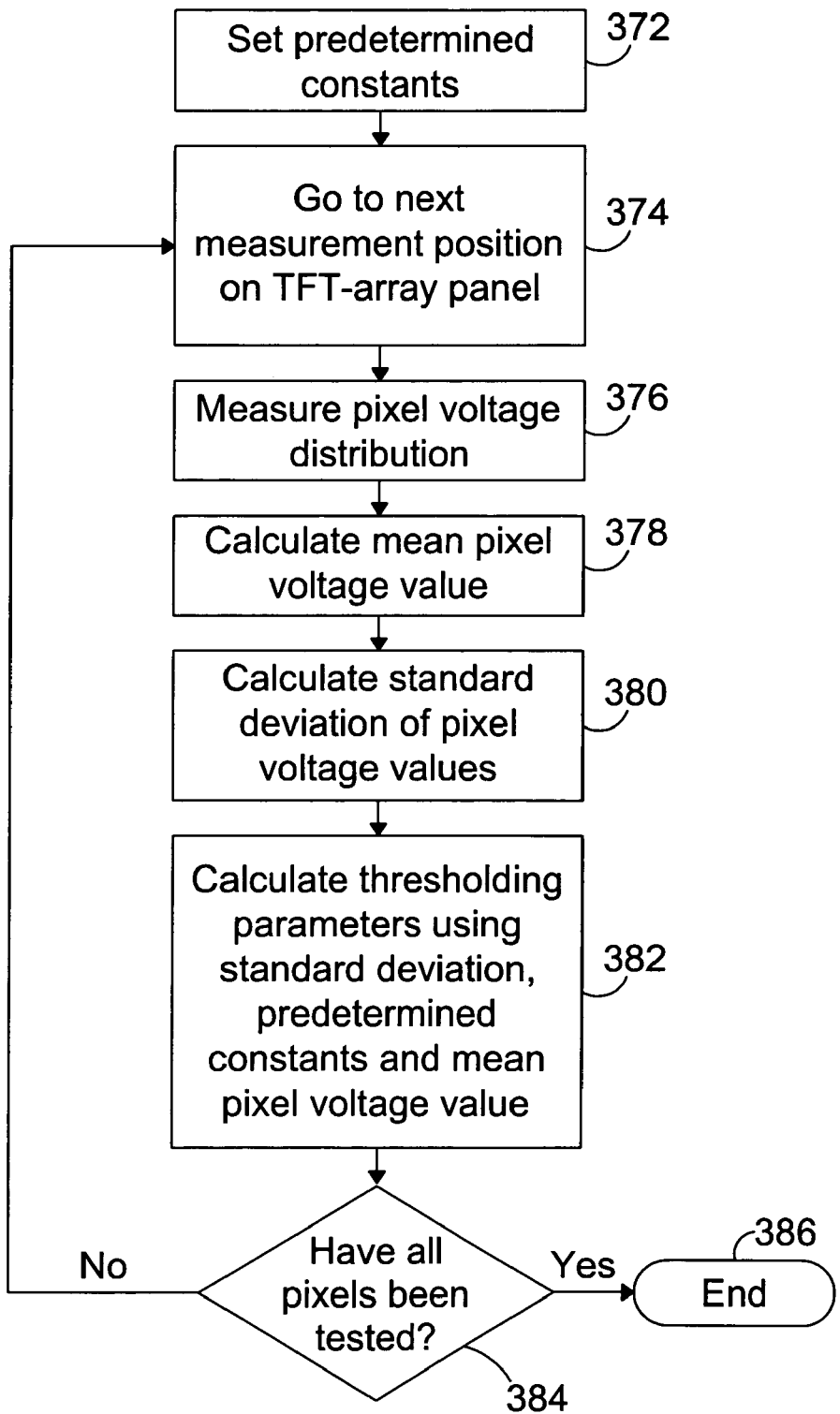
FIG. 3F is a flow chart showing steps in a standard deviation measurement process, in accordance with one embodiment of the present invention.

FIG. 3F is a flow chart showing steps in a standard deviation measurement process, in accordance with one preferred embodiment of the present invention. The process starts at step 372, where the predetermined constants are set. The process then proceeds to step 374, where the TFT-array panel and/or the sensor of the TFT-array tester are positioned at the next measurement position. If this is the first measurement, then the TFT-array panel and/or the sensor of the TFT-array tester are positioned at the first measurement position.

Next, at step 376, the pixel voltage distribution is measured by the TFT-array tester for the set of pixels that can be accessed by the TFT-array tester at the current measurement position. Then, at step 378, a mean pixel voltage value is calculated based on the pixel voltage distribution measured at step 376.

The process then proceeds to step 380, where the standard deviation of the pixel voltage values obtained at step 376 is calculated. Next, at step 382, the thresholding parameters used to classify defective pixels are calculated based on the calculated standard deviation and mean pixel voltage values, and the predetermined constants.

At step 384, it is determined whether all the pixels in the panel have been tested. If all the pixels in the panel have been tested, the process ends at step 386. Otherwise, the process jumps back to step 374.

The thresholding parameters calculated at step 382 are then used by the TFT-array testing system (controller 366 in FIG. 3B) to determine whether any of the pixels that were tested at the current measurement position are defective. As discussed above, the standard deviation measurement process is particularly suited for the testing of TFT-array panels that contain more pixels than can be measured by the sensor of the TFT-array tester in a single measurement. In this case, the TFT-array tester needs to perform multiple measurements in order to measure all the pixels in the TFT-array panel. The system and method of the present invention calculates the standard deviation of the measured pixel voltages at each measurement point, and adjusts the thresholding parameters based on the calculated standard deviation.

However, it should be appreciated that the standard deviation measurement process can also be used for the testing of smaller TFT-array panels, in which all the pixels of the TFT-array panel can be measured by the sensor of the TFT-array tester in a single measurement. In this case, the standard deviation of the pixel voltages would be measured for the one measurement point, and used to determine the thresholding parameters used to classify the pixels. Then, when a new TFT-array panel is tested, the standard deviation is again calculated for that TFT-array panel and used accordingly. In this way, differences in the standard deviation of pixel voltages between different TFT-array panels can be monitored and used to adjust the thresholding parameters.

Changes in the measured standard deviation of pixel voltages, either between different measurement points on a common TFT-array panel or between different TFT-array panels, can be an indicator of a potential malfunction or performance degradation of the TFT-array tester 364. Accordingly, the standard deviation measurement process described above can also be used to monitor the performance of the TFT-array tester 364. For example, the controller 366 can be programmed so that a predetermined fluctuation amount in the measured standard deviation will trigger a warning signal. The trigger can be based on a predetermined fluctuation in the standard deviation between different measurement points on a common TFT-array panel, a predetermined fluctuation in the standard deviation between different TFT-array panels, a predetermined fluctuation in the average standard deviation for an entire lot of TFT-array panels, a predetermined fluctuation in the average standard deviation of a TFT-array panel, or based on any other definable fluctuation in the measured standard deviation of the pixel voltage values.

2. Flexible Thresholding

Foreign substances or particles on TFT-array panels may generate one or more single pixel defects and/or one or more groups of multiple pixel defects in a localized area. A single pixel defect (SPD) is herein defined as an isolated defective pixel with no other immediately adjacent defective pixel. A group of multiple pixel defects (MPD) is herein defined as two or more adjacent defective pixels.

During normal production of TFT-LCDs, the total number of SPDs or MPDs that arise from the presence of foreign substances or particles rarely exceed a critical number (TNc). Sometimes, however, the TFT-array testing equipment will report an abnormally high number of SPDs or MPDs (greater than TNc) due to process non-uniformity or process contamination over an abnormally high pixel area, or due to inaccurate measurement by the testing equipment.

A "flexible thresholding" process can be used in the TFT-array testing system 362 in order to properly handle the case of abnormally high SPDs and MPDs. First, one needs to define a parameter TNc as the critical total number of single pixel defects or gatherings of multiple pixel defects so that the probability of having more than TNc is negligently small in TFT-LCD manufacturing. TNc can vary depending on the fabrication and testing setups, and is preferably determined experimentally. TNc is also preferably chosen such that a repair attempt is not made on a TFT-array panel whose number of defects exceeds TNc. For example, it has been observed experimentally that TNc for the test and assembly stage of FIG. 2 is approximately 10.

Under the flexible thresholding process, if the total number of SPDs and MPDs is larger than TNc, then the TFT-array test system 362 tries to reduce the total number of SPDs and MPDs (TN) to a number equal to or less than but close to TNc by loosening the thresholding parameters, which sets the pass or fail boundaries of the measured pixel. Optionally, the amount that each thresholding parameters is loosened can have a maximum limit and, once the thresholding parameter has reached this limit, the process of reducing the total number of defects (TN) is stopped.

Figure 4:
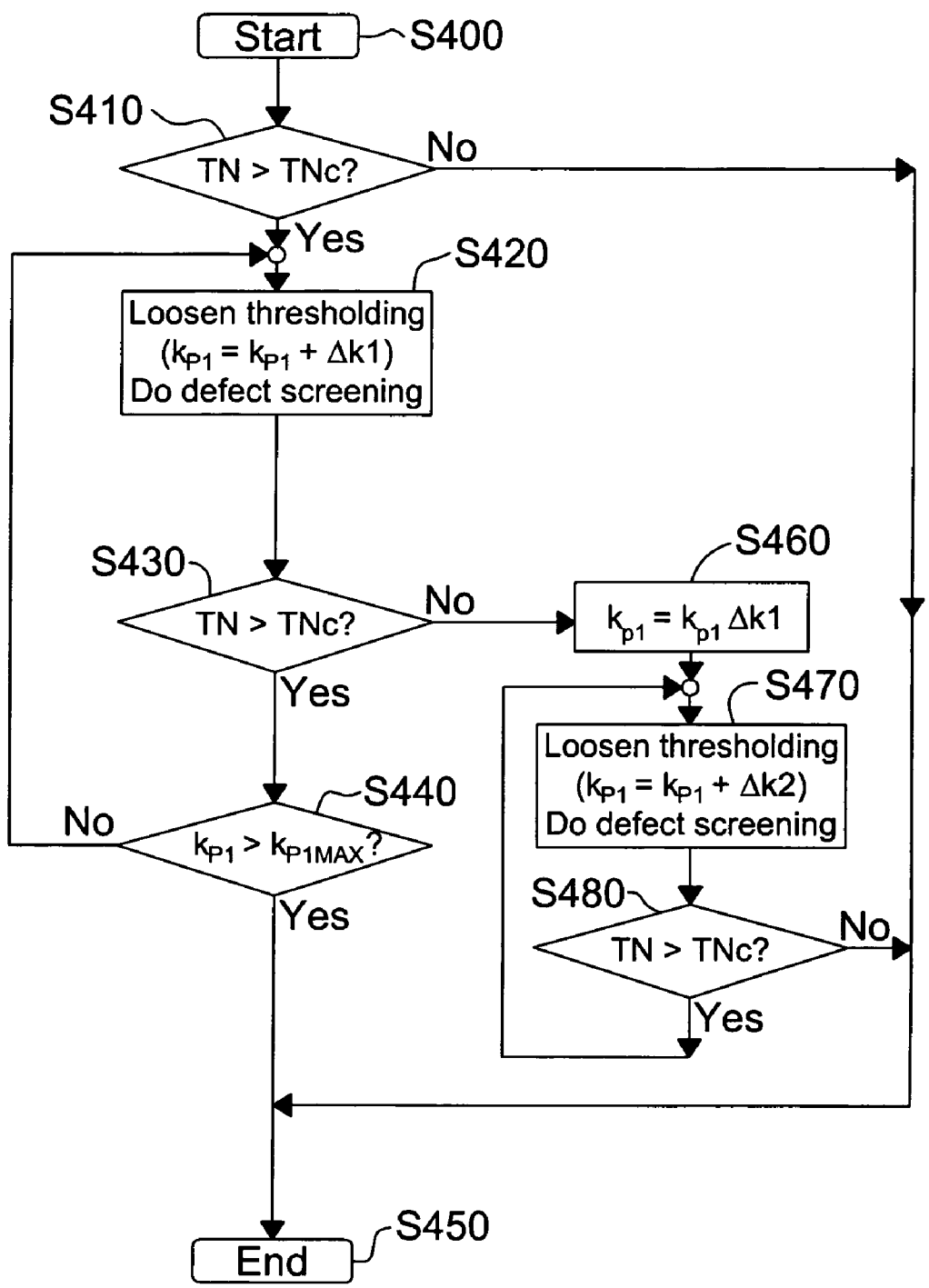
FIG. 4 is a flow chart showing steps in a flexible thresholding process, in accordance with one preferred embodiment of the present invention.

FIG. 4 is a flow chart showing steps in a flexible thresholding process, in accordance with one preferred embodiment of the present invention. The process starts at step S400 and proceeds to step S410, where it is determined if the total number of SPDs and MPDs exceeds the predetermined critical number TNc. If so, the process continues to step S420. Otherwise, the process jumps to step S450, where it ends.

At step S420, the thresholding parameter $k_{P1}$ is increased by an amount $\Delta k1$, and the TFT-array testing system 362 performs a new defect screening using the increased $k_{P1}$ thresholding parameter that yields an updated number of total defects TN. Then, at step S430, it is determined if the updated number of total defects TN is greater than TNc. If so, then the process proceeds to step S440. Otherwise, the process jumps to step S460.

At step S440, it is determined if the increased $k_{P1}$ thresholding parameter is greater than a predetermined maximum value $k_{P1MAX}$. If so, the process ends at step S450. Otherwise, the process jumps back to step S420.

At step S460, $\Delta k1$ is subtracted from the most recent value of the thresholding parameter $k_{P1}$. Then, at step S470, the thresholding parameter $k_{P1}$ is increased by an amount $\Delta k2$, which is a smaller increment than $\Delta k1$, and the TFT-array testing system 362 performs a new defect screening using the increased $k_{P1}$ thresholding parameter that yields an updated number of total defects TN. Then, at step S480, it is determined if the updated number of total defects TN is greater than TNc. If so, then the process jumps back to step S470. Otherwise, the process jumps to step S450 and ends.

This process shown in FIG. 4 is preferably repeated for each thresholding parameter when multiple thresholding parameters are used by the TFT-array testing system 362.

There could be various possible causes for an abnormally high number of SPDs or MPDs, and the flexible thresholding process of the present invention can be used to analyze those possible causes. Process non-uniformity or process contamination over an abnormally large pixel area can potentially cause an abnormally high number of SPDs or MPDs. However, process non-uniformity or process contamination may or may not turn out to be the actual process problem that causes real defects that may ultimately be detected by later cell or module inspections.

In most cases, process non-uniformities and process contamination are hard to identify under a microscope, and they cannot be repaired by TFT-array repair equipment even if they are identified. Thus, reducing TN to a number equal to or less than but close to TNc will decrease the operation time of the TFT-array repair equipment, because of the reduced number of potential defects it will be required to handle.

Inaccuracies in the TFT-array testing system 362 can also cause an abnormally high number of SPDs or MPDs to be reported. In this case, reducing TN to a number equal to or less than but close to TNc will result in the TFT-array testing system 362 reporting a smaller number of potential defects, with the potential defects that are reported having a higher probability of being real defects. Thus, the flexible thresholding process improves the defect detection accuracy of the TFT-array testing system 362, even when the system's intrinsic performance is inaccurate.

Even though the probability of this occurring is very low, the presence of foreign substances or particles on the TFT-array panel can cause an abnormally high number of SPDs or MPDs. In this case, the flexible thresholding process will exclude some real defects that will not be included in the final defect report. However, even if the flexible thresholding process excludes real defects, this will generally not be an issue because a TFT-array panel whose total number of defects is greater than TNc is generally not repaired and is therefore useless anyway.

As discussed above, process non-uniformities and/or process contamination may or may not turn out to be actual process problem causing real defects in the TFT-array panels. These defects may be detected by cell or module inspections, or they may pass these inspections but still cause noticeable display defects. Therefore, for TFT-array panels that exhibit an abnormally high number of SPDs or MPDs, the TFT-array testing system 362 is preferably configured to generate a warning signal (e.g., through a notation in the defect file), that is sent to cell and module inspection equipment. In this way, the inspection equipment can be triggered to perform a more stringent inspection of the TFT-array panels with an abnormally high number of reported defects. Additional aging tests can also be performed on those TFT-array panels to screen out those panels with process non-uniformities or process contamination that may lead to display defects.

If an abnormally high number of SPDs or MPDs reported by the TFT-array testing system 362 is correlated to real defects during cell inspection, module inspection, aging test, or actual usage of the display, then this defect information is preferably collected and used to try to remove the causes of the abnormally high number of defects (e.g., remedy the process non-uniformities or remove the causes of the process contamination) in the TFT-array fabrication process.

Alternatively, if an abnormally high number of SPDs or MPDs reported by the TFT-array testing system 362 is not correlated to real defects during cell inspection, module inspection, aging test, or actual usage of the display, then this false defect information is preferably collected and used to improve the measurement performance of TFT-array testing system 362 in order to reduce the number of false defects reported by the TFT-array testing system 362.

The present invention can be implemented on a server, which may be or include, for instance, a work station running any type of operating system or platform. However, the present invention could also be implemented on a programmed general purpose computer, a special purpose computer, a programmed microprocessor or microcontroller and peripheral integrated circuit elements, an ASIC or other integrated circuit, a hardwired electronic or logic circuit such as a discrete element circuit, a programmable logic device such as a FPGA, PLD, PLA, or PAL, or the like. In general, any device on which a finite state machine capable of implementing the process steps, methods and mathematical routines discussed above can be used to implement the present invention.

The present invention may also be implemented in the form of a computer-readable medium storing a computer program for performing any one or more of the embodiments of the invention previously described herein. The computer-readable medium may be removable or permanent, magnetic or optical, or any other type of storage medium known. Examples include but are not limited to floppy disks and diskettes, compact discs, flash memories, digital tape, hard disks, and digital memories including those formed on stand-alone chips or incorporated with a processor on a single chip. The program may be one executable by a general-purpose processing system such as, but not limited to, a microprocessor-driven system, or the program may be one executable by a special-purpose processor, such as an ASIC or any other type known.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of improving defect detection accuracy of an electrode array testing system, wherein the electrode array defines a plurality of pixels and wherein the electrode array testing system determines if a pixel is defective based on at least one thresholding parameter that controls a pass/fail criteria of each pixel during testing of the TFT panel, comprising:

defining a critical number of defects;

comparing a number of defects reported by the electrode array testing system "reported defects" to the critical number of defects;

adjusting the at least one thresholding parameter if the number of reported defects is greater than the critical number of defects, until the number of reported defects is less than or equal to the critical number of defects, wherein the adjusting comprises, incrementally adjusting the at least one thresholding parameter by a first increment value until the number of reported defects is less than the critical number of defects to yield a first thresholding parameter value, subtracting one increment value from the first thresholding parameter value to yield a second thresholding parameter value, and incrementally adjusting the second thresholding parameter value by a second increment value until the number of reported defects is less than the critical number of defects to yield a final thresholding parameter value, wherein the second increment value is smaller than the first increment value.

2. The method of claim 1, wherein the at least one thresholding parameter is adjusted until the number of reported defects is less than or equal to the critical number of defects or until the at least one thresholding parameter reaches a predetermined maximum value.

3. The method of claim 1, wherein the critical number of defects corresponds to a number of defects over which the at least one thresholding parameter is adjusted to reduce the number of reported defects.

4. The method of claim 1, further comprising alerting a repair station and or cell and/or module inspection station if the number of reported defects has been reduced by adjusting the at least one thresholding parameter.

5. A computer-readable medium storing a program for improving defect detection accuracy of an electrode array testing system, wherein the electrode array defines a plurality of pixels and wherein the electrode array testing system determines if a pixel is defective based on at least one thresholding parameter that controls a pass/fail criteria of each pixel during testing of the TFT panel, said program comprising:

a first code section which compares a number of defects reported by the electrode array testing system "reported defects" to a predetermined critical number of defects;

a second code section which, if the number of reported defects is greater than the critical number of defects, adjusts the at least one thresholding parameter until the number of reported defects is less than or equal to the critical number of defects, wherein the second code section comprises:

a first code subsection that incrementally adjusts the at least one thresholding parameter by a first increment value until the number of reported defects is less than the critical number of defects to yield a first thresholding parameter value, a second code subsection that subtracts one increment value from the first thresholding parameter value to yield a second thresholding parameter value, and a third code subsection that incrementally adjusts the second thresholding parameter value by a second increment value until the number of reported defects is less than the critical number of defects to yield an final thresholding parameter value, wherein the second increment value is smaller than the first increment value.

6. The computer-readable medium of claim 5, wherein the second code section adjusts the at least one thresholding parameter until the number of reported defects is less than or equal to the critical number of defects or until the at least one thresholding parameter reaches a predetermined maximum value.

7. The computer-readable medium of claim 5, wherein the critical number of defects corresponds to a number of defects over which the at least one thresholding parameter is adjusted to reduce the number of reported defects.

8. The computer-readable medium of claim 5, further comprising a third code section that alerts a repair station and/or cell and/or module inspection station if the number of reported defects has been reduced by adjusting the at least one thresholding parameter.

* * * * *